United States Patent
Yamanaka

(10) Patent No.: US 8,169,553 B2
(45) Date of Patent: May 1, 2012

(54) ASSEMBLING STRUCTURE FOR FLAT-PANEL DISPLAY UNIT, AND FLAT-PANEL TELEVISION

(75) Inventor: Takahito Yamanaka, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1069 days.

(21) Appl. No.: 12/079,652

(22) Filed: Mar. 28, 2008

(65) Prior Publication Data

US 2008/0238269 A1    Oct. 2, 2008

(30) Foreign Application Priority Data

Apr. 2, 2007    (JP) ................................. 2007-096466

(51) Int. Cl.
*H04N 5/64* (2006.01)
(52) U.S. Cl. ......................................... 348/836; 348/843
(58) Field of Classification Search .................. 348/836, 348/837, 838, 839, 840, 841, 842, 843
See application file for complete search history.

(56) References Cited

U.S. PATENT DOCUMENTS

| | | | | | |
|---|---|---|---|---|---|
| 5,575,545 | A | * | 11/1996 | Wang | 312/7.2 |
| 5,793,494 | A | * | 8/1998 | Douken et al. | 348/739 |
| 5,863,106 | A | * | 1/1999 | Beak | 312/7.2 |
| 6,166,783 | A | * | 12/2000 | Ahn | 348/836 |
| 7,129,997 | B1 | * | 10/2006 | Kim et al. | 348/836 |

FOREIGN PATENT DOCUMENTS

| | | |
|---|---|---|
| JP | 3021536 U | 11/1995 |
| JP | 09-65250 | 3/1997 |
| JP | 3100122 U | 12/2003 |

* cited by examiner

*Primary Examiner* — Jeanette E Chapman
*Assistant Examiner* — James Buckle, Jr.
(74) *Attorney, Agent, or Firm* — Yokoi & Co., U.S.A., Inc.; Toshiyuki Yokoi

(57) ABSTRACT

An assembling structure for a flat-panel display unit, comprising: a housing body comprised of a front cabinet and a rear cabinet is assembled to house a flat display panel; at both side faces of rear cabinet, several base portions that are extended by predetermined lengths toward the front cabinets from the both side faces are provided; at inner sides of side faces of the front cabinet, engaging portions for engaging the base portions are provided; at the base portions, protruding portions are provided; at the engaging portions, guides for allowing the protruding portions to be slid are formed at predetermined angles relative to a direction perpendicular to a display face of the flat display panel.

9 Claims, 4 Drawing Sheets

ASSEMBLING STRUCTURE FOR FLAT-PANEL DISPLAY UNIT, AND FLAT-PANEL TELEVISION

CROSS-REFERENCES TO RELATED APPLICATIONS

The present application is related to the Japanese Patent Application No. 2007-96466, filed Apr. 2, 2007, the entire disclosure of which is expressly incorporated by reference herein.

BACKGROUND OF THE INVENTION (1) Field of the Invention

The present invention relates to an assembling structure for a flat-panel display unit and a flat-panel television and, particularly, to an assembling structure for a flat-panel display unit, in connection with assembling of a housing body housing a flat display panel, and a flat-panel television employing the assembling structure for the flat-panel display unit.

(2) Description of Related Art

As shown in FIG. 4, in a flat-panel television, a housing body 2 that is comprised of a front cabinet 2a and a rear cabinet 2b in such a manner to house a flat display panel module 1, etc. is assembled. For example, several threaded holes 3 are formed at the front cabinet 2a. Moreover, several screw-insertion holes 4 corresponding to the threaded holes are formed at the rear cabinet 2b. In a condition where the front cabinet 2a and the rear cabinet 2b are combined while allowing the flat display panel module 1, etc. to be fixed and housed, fixing-screws are inserted through the screw insertion holes 4 of the rear cabinet 2b and threaded into the threaded holes 3 of the front cabinet 2a, to thereby assemble the housing body 2.

In this way, in order to attach the rear cabinet 2b to the front cabinet 2a, a plurality of screws are employed. Therefore, there is a possibility that this becomes a factor that causes problems of deterioration of assembleability of the housing body, an increase in cost, etc.

In regard to the above-mentioned problems, it has been variously proposed to refrain from the use of the screws by replacing a part of screw-stopping, for example, with nesting by claws and hole portions.

For example, in Japanese Utility Model Registration No. 3,021,536, there is disclosed a coupling structure of cabinets, in which a prolongation portion is provided by causing a fitting portion of a front cabinet to be substantially convexly prolonged toward a fitted-on portion of a rear cabinet and slide guides are formed at both side regions of the prolongation portion, whereas the fitted-on portion of the rear cabinet is substantially concavely formed so as to match the outer shape of the prolongation portion, and guide rails for allowing the slide guides to be slid are provided at both inner side regions of the fitted-on portion.

Also, in Japanese Utility Model Registration No. 3,100, 122, there is disclosed a coupling structure of a tray chassis and a front cabinet, in which slide movement of the tray chassis is made, at an inner side of a bottom surface thereof, toward the front cabinet while employing, as its supports, fitting claws that are provided at two left and right regions of a bottom portion of the tray chassis and, when the fitting claws reach locations, at which fitting holes are formed, according to the slide movement, fitting between the fitting claws and the fitting holes is made.

Moreover, in Japanese Patent Application Laid-Open No. Hei. 9-65250, there is disclosed a coupling structure of cabinets, in which an engaged portion is formed at an upper surface of a front cabinet and an engaging portion corresponding to the engaging portion of the front cabinet is formed at an upper surface of a rear cabinet and, when the cabinets are combined at cabinet assembling step, the upper surfaces of the cabinets are engagingly stopped by the engaging portion and the engaged portion.

However, at the portions at which the front cabinet and the rear cabinet are fitted together (engage), there are possibilities that a jar will be produced relative to a direction perpendicular to the display face of a flat display panel and junction strength will become short. That is, it is possible to hold down the assembling time and the number of parts by refraining from the screw-fastening, whereas there is a possibility that the junction strength of the front cabinet and the rear cabinet will be reduced. It has not been proposed to cause the holding-down of the assembling time and the ensuring of the junction strength to thus stand together.

BRIEF SUMMARY OF THE INVENTION

The present invention has been made in view of the above-mentioned problems and provides an assembling structure for a flat-panel display unit which can hold down the assembling time and the number of its parts as less as possible while ensuring junction strength of a front cabinet and a rear cabinet.

In order to solve the above problems, according to an embodiment of the present invention, an assembling structure for a flat-panel display unit, comprising: a housing body comprised of a front cabinet and a rear cabinet is assembled to house a flat display panel; at both side faces of at least one of the front and rear cabinet, several base portions that are extended by predetermined lengths, toward the other of the front and rear cabinets from the both side faces are provided; at inner sides of side faces of the other one of the front and rear cabinet, engaging portions for engaging the base portions are provided; at regions of at least one of the base portions and the engaging portions protruding portions are provided; at regions of the other one of the base portions and the engaging portions, guides for allowing the protruding portions to be slid are formed at predetermined angles relative to a direction perpendicular to a display face of the flat display panel; and the housing is assembled by inserting the protruding portions into the guides while the protruding portions are slid along the guides, enabling the front cabinet and the rear cabinet to be combined together.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. Referring to the drawings in which like reference character(s) present corresponding parts throughout.

DETAILED DESCRIPTION OF THE INVENTION

Embodiments of the present invention will be explained hereinafter with reference to the drawings according to the following items:
(1) Description of a flat-panel display unit (liquid crystal television);
(2) Assembling structure for the liquid crystal television; and
(3) Summary.
(1) Description of a flat-panel display unit (liquid crystal television)

Figure 1:
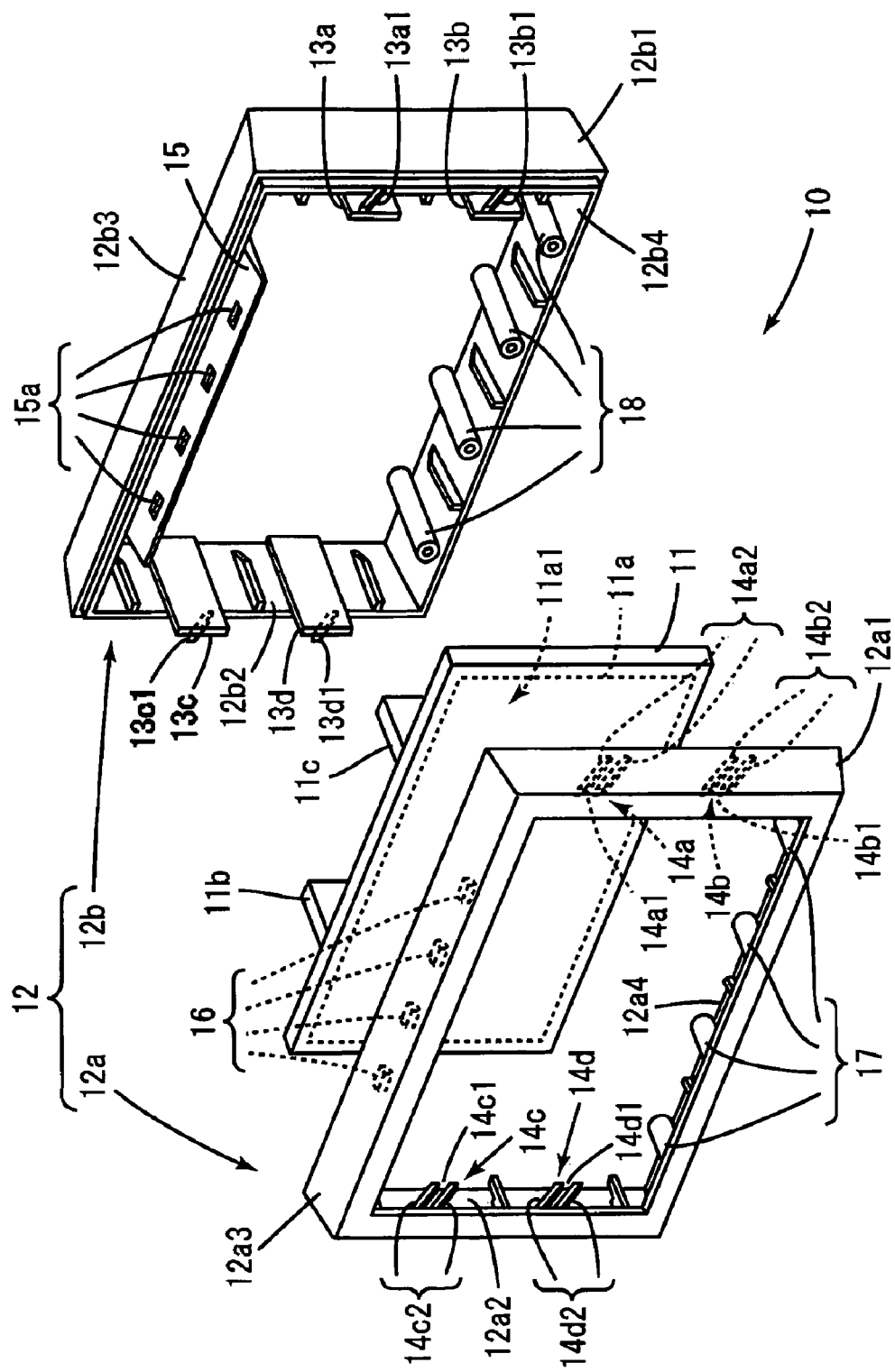
FIG. 1 is a perspective view showing one example of a liquid crystal television.

FIG. 1 is a perspective view showing a liquid crystal television 10 that is one example of a flat-panel television serving as a flat-panel display unit to which the present invention is applied. In FIG. 1, the liquid crystal television 10 is comprised of a module 11 and a housing body 12 as its main constituents.

The module 11 has a recessed portion for housing a liquid crystal panel 11a serving as a flat display panel and is a frame-shaped structure with a thin thickness. The module 11 is covered on its rear face side by a shield panel made of sheet metal, with metal-made frame portions being arranged on its front face side and side-face sides in such a manner to surround a view area of the liquid crystal panel 11a. Moreover, pillar-shaped chassis-brackets 11b, 11c are screw-stopped to a rear face of a display face 11a1 of the liquid crystal panel 11a as reinforcing members of the module 11.

The liquid crystal panel 11a is a structure in which pixels filled with liquid crystal material whose molecule arrangement is varied according to a value of a drive voltage are arranged in a matrix form, and which is provided at its rear portion with a backlight. The liquid crystal panel 11a constructed in this way displays an image by applying a predetermined voltage to the respective pixels filled with the liquid crystal material to thereby change the arrangement and changing the transmissivity of light from the backlight.

The housing body 12 is comprised of a front cabinet 12a and a rear cabinet 12b. The front cabinet 12a has an opening portion at its front face for displaying an image. After the module 11 has been screw-stopped to the front cabinet 12a, the rear cabinet 12b is mounted to the front cabinet 12a, whereby respective components constituting the liquid crystal television 10 are housed.

Figure 2:
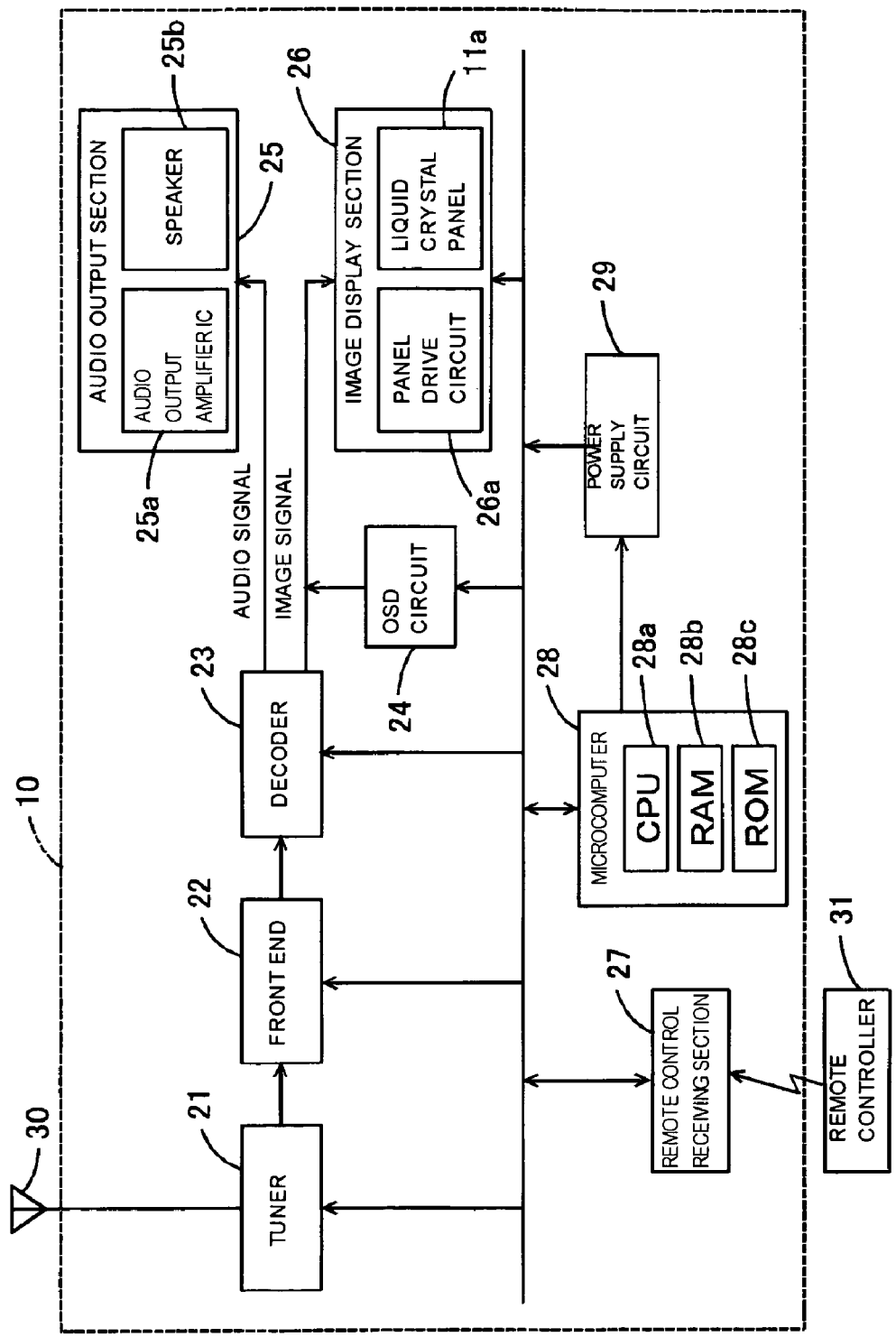
FIG. 2 is a block structure diagram of the liquid crystal television.

FIG. 2 is a block structure diagram of the liquid crystal television 10. In FIG. 2, the liquid crystal television 10 is provided with a tuner 21, a front end 22, a decoder 23, an OSD circuit 24, an audio output section 25, an image display section 26, a remote control receiving section 27, a microcomputer 28, and a power supply circuit 29.

The tuner 21 is connected to, for example, an antenna 30 and, according to a control signal inputted from the microcomputer 28, obtains a television broadcast signal corresponding to one channel (for example, a channel tuned in by a user), from television broadcast signals received by the antenna 30, and outputs it to the front end 22.

The front end 22 converts the television broadcast signal outputted from the tuner 21 into an intermediate frequency signal, according to, for example, the control signal inputted from the microcomputer 28, and outputs it to the decoder 23.

The decoder 23 causes the intermediate frequency signal, outputted from the front end 22, to be subjected to processing corresponding to a predetermined file format (for example, MPEG-2 format, etc. well known), to thereby divide the intermediate frequency signal into an audio signal and an image signal and decode. Then, the decoder outputs the decoded audio signal to the audio output section 25 and, at the same time, outputs the image signal to the image display section 26.

The OSD circuit 24 causes an OSD display signal, for causing the image display section 26 to carry out predetermined OSD displaying (on-screen displaying), to be synthesized with the image signal outputted to the image display section 26 from the decoder 23, according to, for example, the control signal inputted from the microcomputer 28.

The audio output section 25 includes, for example, an audio output amplifier IC (D-AMP) 25a, a speaker 25b, etc., causes the audio signal, inputted from the decoder 23 by the audio output amplifier IC 25a, to be subjected to predetermined processing such as power amplification, and causes an audio corresponding to an audio date based on the audio signal to be outputted from the speaker 25b.

The image display section 26 includes, for example, a panel drive circuit 26a, a liquid crystal panel 11a, etc. and displays an image corresponding to an image data based on the image signal outputted from the decoder 23, and an image corresponding to an image data based on the image signal that is outputted from the decoder 23 and synthesized with the OSD display signal by the OSD circuit 24.

The remote control receiving section 27 receives various signals (control commands) transmitted from, for example, the remote controller 31 and outputs various data based on the various signals to the microcomputer 28.

The remote controller 31 is operated by, for example, a user and transmits a signal corresponding to the operation to the remote control receiving section 27. More concretely, the remote controller 31 includes a channel key, a channel up/down key, etc. that are operated when a channel to be tuned in is designated.

The microcomputer 28 includes, for example, CPU 28a, RAM 28b, ROM 28c, etc. and controls operation of the liquid crystal television 10. For example, the microcomputer 28 controls switching of channels, sound volume up/down, etc. on the basis of the control commands received at the remote control receiving section 27.

The CPU 28a performs various control operations according to various processing programs for the liquid crystal television 10 that are memorized in the ROM 28c.

The RAM 28b is provided with a storage region for storing a program for developing a processing program, etc. performed by the CPU 28a, and a data storage region for storing an input data, processing results produced at the time of performing the processing program, etc.

The ROM 28c memorizes a system program capable of being performed in the liquid crystal television 10, various processing programs capable of being performed by the system program, data to be utilized at the time of performing these various processing programs, data on various results arithmetically processed by the CPU 28a, etc. Incidentally, the programs are memorized, in the form of program codes capable of being read by the computer, in the ROM 28c.

The power supply circuit 29 is, for example, a partially-resonant power supply circuit and converts normal AC power into a variety of predetermined voltages and outputs operation power supply voltages to the respective sections of the liquid crystal television 10.

Incidentally, an unshown substrate on which the tuner 21, the front end 22, the decoder 23, the OSD circuit 24, the audio output amplifier IC (D-AMP) 25a, the panel drive circuit 26a, the remote control receiving section 27, the microcomputer 28, the power supply circuit 29, etc. are mounted is fixed to, for example, the unshown shield panel covering the rear face side of the module 11. Moreover, the speaker 25b is screw-stopped to, for example, the front cabinet 12a.

(2) Assembling structure for the liquid crystal television

Referring to FIG. 1, an assembling structure for the liquid crystal television 10 will be explained in detail. In FIG. 1, at side faces 12b1, 12b2 of the rear cabinet 12b, a plurality of base portions 13a, 13b, 13c, 13d that are extended, by predetermined lengths, toward the front cabinet 12a from the respective side faces 12b1, 12b2 are provided. Moreover, at inner sides of side faces 12a1, 12a2 of the front cabinet 12a, engaging portions 14a, 14b, 14c, 14d for respectively engaging the base portions 13a, 13b, 13c, 13d are provided.

At the base portions 13a, 13b, 13c, 13d, protruding portions 13a1, 13b1, 13c1, 13d1 that project, by predetermined length, in an outward direction substantially perpendicular to the extended direction toward the front cabinet 12a are formed at predetermined angles relative to a direction perpendicular to the display face 11a1 of the liquid crystal panel 11a and with predetermined lengths.

At the engaging portions 14a, 14b, 14c, 14d, guides 14a1, 14b1, 14c1, 14d1 that allow the protruding portions 13a1, 13b1, 13c1, 13d1 to be slid at the time of mounting the rear cabinet 12b to the front cabinet 12a are formed at the predetermined-angles. The guides 14a1, 14b1, 14c1, 14d1 are respectively formed, at the predetermined angles and with predetermined lengths, by two parallel protruding portions 14a2, 14b2, 14c2, 14d2 for guide that project, with predetermined lengths, toward an inward direction perpendicular to the side faces from the inner sides of the side faces 12a1, 12a2.

The above-mentioned predetermined-angles relative to the direction perpendicular to the display face 11a1 of the liquid crystal panel 11a are set so as to allow an upper surface 12b3 of the rear cabinet 12b to approach toward an upper surface 12a3 of the front cabinet 12a from a bottom surface 12a4 side of the front cabinet 12a when the protruding portions 13a1, 13b1, 13c1, 13d1 are inserted into the guides 14a1, 14b1, 14c1, 14d1 while being slid along the guides 14a1, 14b1, 14c1, 14d1. Moreover, the predetermined angles are angles that are found according to experimental predetermination in order to restrain a relative position of the front cabinet 12a and the rear cabinet 12b from being shifted toward the direction perpendicular to the display face 11a1 of the liquid crystal panel 11a after the rear cabinet 12b has been integrally combined with the front cabinet 12a.

The protruding portions 13a1, 13b1, 13c1, 13d1 and the guides 14a1, 14b1, 14c1, 14d1 are comprised of triangular cross-section that allow spaces between the protruding portions 13a1, 13b1, 13c1, 13d1 and the guides 14a1, 14b1, 14c1, 14d1 to become narrower as the protruding portions 13a1, 13b1, 13c1, 13d1 are inserted into the guides 14a1, 14b1, 14c1, 14d1, in such a manner that a jar is restrained after the rear cabinet 12b has been integrally combined with the front cabinet 12a.

At the upper surface 12b3 of the rear cabinet 12b, a fitting base portion 15 that is extended, by a predetermined length, toward the front cabinet 12a from the upper surface 12b3 is provided. The fitting base portion 15 is formed with a plurality of fitting hole portions 15a that are rectangle-shaped holes serving as fitting portions. Moreover, at an inner side of the top surface 12a3 of the front cabinet 12a, a plurality of fitting claw portions 16 that are rectangular parallelepiped-shaped protrusions with wedge-shaped tips serving as fitted-in portions that are fitted in the several fitting hole portions 16 are formed. The fitting hole portions 15a and the fitting claw portions 16 are provided in order not to employ screw-fastening at the upper surfaces 12a3, 12b3 when the rear cabinet 12b is integrally combined with the front cabinet 12a.

In order to screw-fasten the bottom surfaces when the rear cabinet 12b is integrally combined with the front cabinet 12a, a plurality of threaded holes 17 are formed at the bottom surface 12a4 of the front cabinet 12a and a plurality of screw-insertion holes 18 corresponding to the threaded holes 17 are formed at the bottom surface 12b4 of the rear cabinet 12b. If at the bottom surfaces 12a4, 12b4, a coupling structure by fitting is employed in the same manner as at the upper surfaces 12a3, 12b3, separation of the front cabinet 12a and the rear cabinet 12b becomes considerably hard, so that a coupling structure by screw-fastening is employed with respect to the bottom surfaces 12a4, 12b only in order that the front cabinet 12a and the rear cabinet 12b can be easily separated, for example, at the time of maintenance of the liquid crystal television 10.

Figure 3:
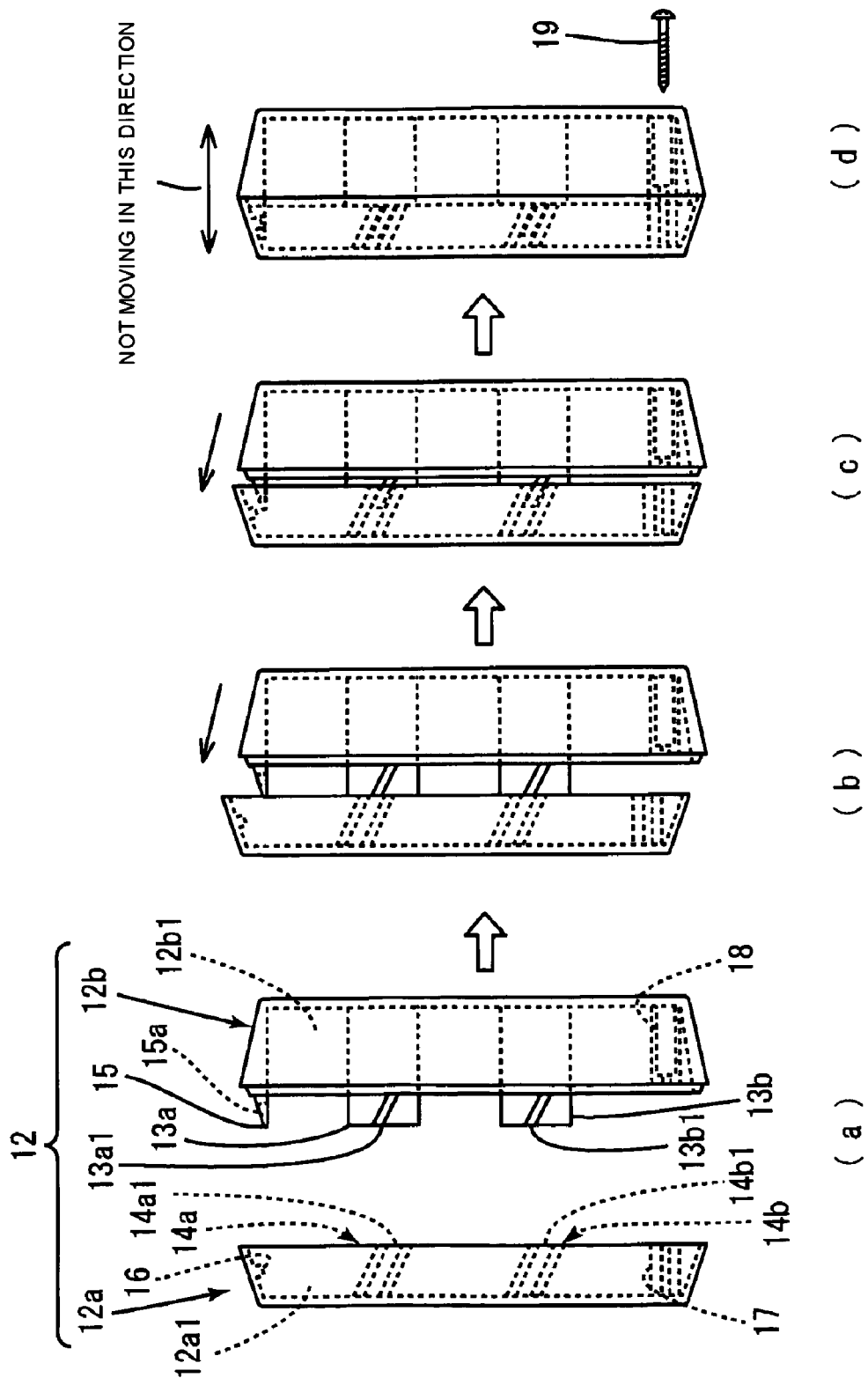
FIG. 3 is a schematic view that is of assistance in explaining assembling operation of a housing body.
Figure 4:
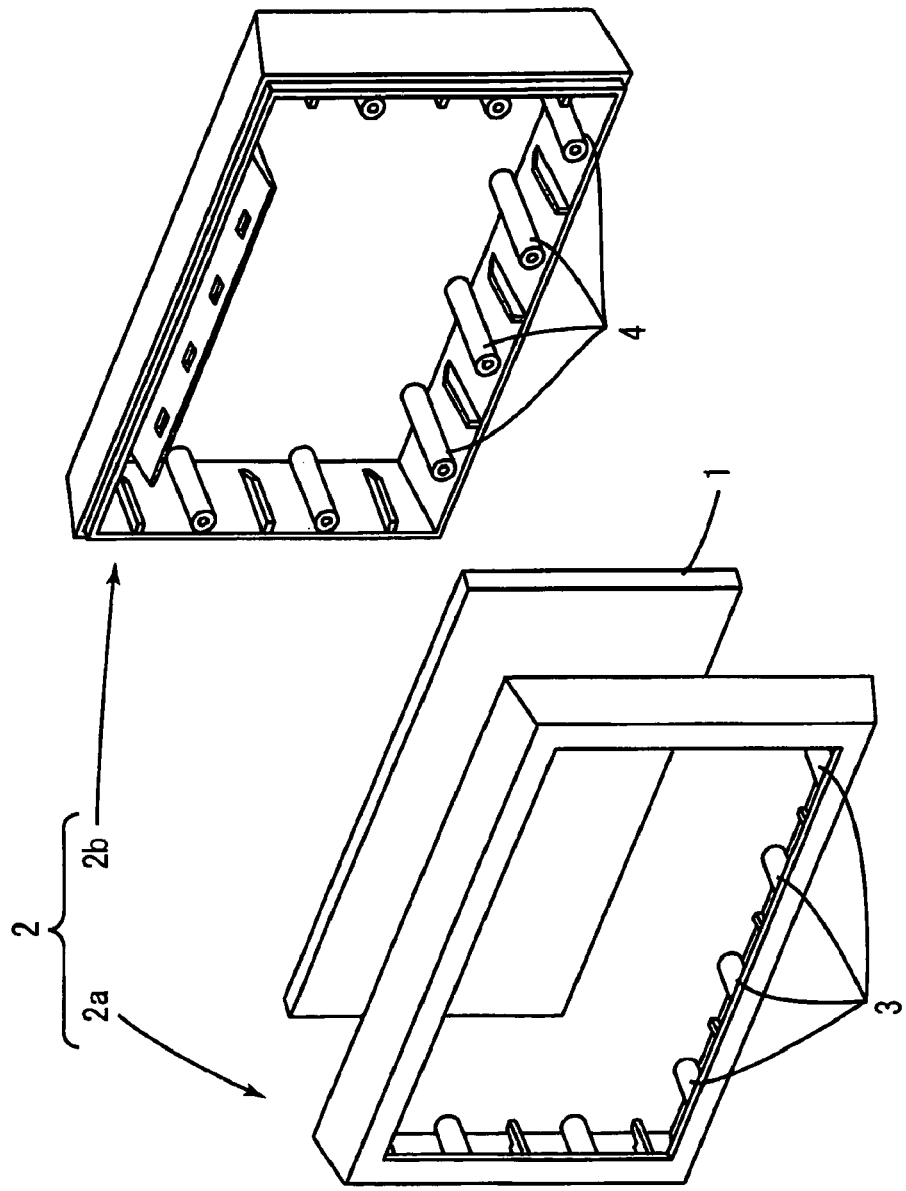
FIG. 4 is a perspective view showing a conventional example of a flat-panel television.

FIG. 3 is a schematic view that is of assistance in explaining assembling operation of the housing body 12. Incidentally, here, the assembling operation is explained with respect to the side faces 12a1, 12b1 on one side.

First, from a condition where the front cabinet 12a and the rear cabinet 12b are separated as shown in (a), the rear cabinet 12b is caused to approach the front cabinet 12a as shown in (b), and tip ends of the protruding portions 13a1, 13b1 are brought to a condition where they approach tip ends of insertion mouths of the guides 14a1, 14b1.

Successively, as shown in (b) and (c), the protruding portions 13a1, 13b1 are inserted into the guides 14a1, 14b1 while being slid along the guides 14a1, 14b1, to thereby bring the rear cabinet 12b to a condition where the rear cabinet 12b further approaches the front cabinet 12a.

Successively, the protruding portions 13a1, 13b1 are further inserted into the guides 14a1, 14b1, the fitting hole portions 15a and the fitting claw portions 16 are fitted together at the upper surfaces 12a3, 12b3 and the rear cabinet 12b is integrally combined with the front cabinet 12a. After the rear cabinet 12b has been integrally combined with the front cabinet 12a, the protruding portions 13a1, 13b1 are allowed to be slid only in the direction along the guides 14a1, 14b1, so that a relative position of the front cabinet 12a and the rear cabinet 12b is not shifted in the direction perpendicular to the display face 11a1 of the liquid crystal panel 11a (a direction indicated in (d) by an arrow). Therefore, when only the bottom surfaces 12a4, 12b4 are screw-fastened, even if screw-fastening is not performed with respect to the side faces 12a1, 12b1 and the upper surfaces 12a3, 12b3, separation of the front cabinet 12a and the rear cabinet 12b is not made. Thus, in this condition, fixing screws 19 are inserted through the screw insertion holes 18 of the rear cabinet 12b and threaded into the threaded holes 17, and the bottom surfaces 12a4, 12b4 are joined by screw-fastening, to thereby finally assemble the housing body 12.

(3) Conclusion

As discussed above, according to this embodiment, the front cabinet 12a and the rear cabinet 12b are integrally combined by causing the protruding portions 13a1, 13b1, 13c1, 13d1 to be inserted into the guides 14a1, 14b1, 14c1, 14d1 while causing the protruding portions 13a1, 13b1, 13c1, 13d1 to be slid along the guides 14a1, 14b1, 14c1, 14d1, in lieu of screw-fastening at the side faces 12a1, 12a2 of the front cabinet 12a and the side faces 12b1, 12b2 of the rear cabinet 12b. Moreover, after they have been combined together, the protruding portions 13a1, 13b1, 13c1, 13d1 are allowed to be slid only in the direction along the guides 14a1, 14b1, 14c1, 14d1, so that junction strength of the front cabinet 12a and the rear cabinet 12b is ensured, at the same time, the assembling time of the liquid crystal television 10 and the number of parts are held down as less as possible, and higher efficiency of the assembling work (a reduction in cost) can be achieved.

Moreover, according to this embodiment, the shapes of the protruding portions 13a1, 13b1, 13c1, 13d1 and the guides 14a1, 14b1, 14c1, 14d1 are made the wedge-shaped structures, so that the jar of the front cabinet 12a and the rear cabinet 12b after their combination is further restricted.

Moreover, according to this embodiment, at the base portions 13a, 13b, 13c, 13d, the protruding portions 13a1, 13b1, 13c1, 13d1 that project, by the predetermined lengths, in the outward direction substantially perpendicular to the extendingly providing direction toward the front cabinet 12a, are formed at the predetermined angles and lengths relative to the direction perpendicular to the display face 11a1 of the liquid crystal panel 11a and with the predetermined lengths and, at the engaging portions 14a, 14b, 14c, 14d, the guides 14a1, 14b1, 14c1, 14d1 are respectively formed, by the predetermined lengths, by the two parallel protruding portions 14a2, 14b2, 14c2, 14d2 for guide that project, by the predetermined lengths, from the inner sides of the side faces 12a1, 12a2, toward the inward direction of the direction perpendicular to the side faces, so the insertion of the protruding portions 13a1, 13b1, 13c1, 13d1 into the guides 14a1, 14b1, 14c1, 14d1 can be easily performed while allowing the protruding portions 13a1, 13b1, 13c1, 13d1 to be slid along the guides 14a1, 14b1, 14c1, 14d1. Moreover, after the front cabinet 12a and the rear cabinet 12b have been combined together, constructing so as to allow the protruding portions 13a1, 13b1, 13c, 13d to be slid only in the direction along the guides 14a1, 14b1, 14c1, 14d1 can be easily realized.

Moreover, according to this embodiment, the upper surfaces of the front cabinet 12a and the rear cabinet 12b are joined by the fitting, so that after the front cabinet 12a and the rear cabinet 12b have been combined together, in parallel with the protruding portions 13a1, 13b1, 13c1, 13d1 being allowed to be slid only in the direction along the guides 14a1, 14b1, 14c1, 14d1, screw-fastening at the upper surfaces is refrained while ensuring the junction strength of the front cabinet 12a and the rear cabinet 12b.

Moreover, according to this embodiment, in the fitting base portion 15 that is provided at the upper surface 12b3 of the rear cabinet 12b so as to be extendingly provided, by the predetermined length, from the upper surface 12b3 of the rear cabinet 12b toward the front cabinet 12a, there are provided the several fitting hole portions 15a that are the rectangle-shaped holes are formed and, and at the inner side of the upper surface 12a3 of the front cabinet 12a, there are provided the several fitting claw portions 16 that are rectangular parallelepiped-shaped protrusions with the wedge-shaped tips are formed, so that when the front cabinet 12a and the rear cabinet 12b are combined together, the upper surfaces 12a3, 12b3 can be easily joined by the fitting.

Moreover, according to this embodiment, when the front cabinet 12a and the rear cabinet 12b are combined together, the bottom surfaces are joined by not fitting but screw-fastening, so that as compared to a case where, in addition to the upper surfaces, the bottom surfaces are also joined by fitting, it is possible to cause the front cabinet 12a and the rear cabinet 12b to be easily separated at the time of, for example, the maintenance of the liquid crystal television 10.

In this way, according to the assembling structure of the flat-panel display unit of the present invention, after the front cabinet and the rear cabinet have been combined together, the protruding portions are allowed to be slid only in the direction along the guides, so that the shift of the relative position of the front cabinet and the rear cabinet to the direction perpendicular to the display face of the flat display panel is restricted.

Therefore, at the side faces of the front cabinet and the rear cabinet, the front cabinet and the rear cabinet are combined together by causing the protruding portions to be inserted into the guides while allowing the protruding portions to be slid along the guides, in lieu of screw-fastening. Moreover, after the combining, the protruding portions are allowed to be slid only in the direction along the guides, so that the assembling time of the flat-panel display unit and the number of its parts are held down as less as possible while ensuring the junction strength of the front cabinet and the rear cabinet and higher efficiency of the assembling work (a reduction in cost) can be achieved.

Moreover, in another embodiment of the present invention, the guide are comprised of triangular cross-section that allow spaces between the protruding portions and the guides to become narrower as the protruding portions are inserted into the guides. According to this invention, after the front cabinet and the rear cabinet have been combined together, their jars are further restricted.

Moreover, in another embodiment of the present invention, the protruding portions are formed at the engaging portions so as to project, by the predetermined lengths, in the inward direction perpendicular to the engaging portions. Moreover, the guides are formed, at the predetermined angles and with the predetermined lengths, at the base portions, by the two parallel protruding portions for guide that project, by the predetermined lengths, in the outward direction perpendicular to the base portions. According to this invention, the insertion of the protruding portions into the guides is easily realized while allowing the protruding portions to be slid along the guides. After the front cabinet and the rear cabinet have been combined together, constructing so as to allow the protruding portions to be slid only in the direction along the guides is easily realized.

Moreover, in another embodiment of the present invention, the protruding portions are formed by pillar-shaped protrusions. According to this invention, the protruding portions are easily formed.

Moreover, in another embodiment of the present invention, at one of top and bottom surfaces that is perpendicular to the side faces of at least one of the front cabinet and the rear cabinet, several fitting portions are formed, and at one of top and bottom surfaces of the other one of the front cabinet and the rear cabinet, fitted-in portions that are fitted in the fitting portions when the front cabinet and the rear cabinet are combined together are formed. According to this invention, the ones of the top and bottom surfaces that are perpendicular to the side faces of the front cabinet and the rear cabinet are joined by the fitting, so that in parallel with the protruding portions being allowed to be slid only in the direction along the guides after the front cabinet and the rear cabinet have been combined together, screw-fastening at the ones of the top and bottom surfaces is refrained while ensuring the junction strength of the front cabinet and the rear cabinet.

Moreover, in another embodiment of the present invention, the fitting base portion is extendingly provided by the predetermined length toward the other of the cabinets from the one face of the one of the cabinets. The fitting portion are the several fitting hole portions that are the rectangular-shaped holes formed in the fitting base portion. Further, the fitted-in portions are the several fitting claw portions that are the rectangular parallelepiped-shaped protrusions with the wedge-shaped tips that are fitted in the several fitting hole portions. According to this invention, the ones of the top and bottom surfaces perpendicular to the side faces of the front cabinet and the rear cabinet are easily joined by the fitting.

Moreover, in another embodiment of the present invention, the others of the top and bottom surfaces that are not subjected to fitting at the time of causing the front cabinet and the rear cabinet to be combined together are joined by the screw-fastening. According to this invention, when the front cabinet and the rear cabinet are combined together, the others of the top and bottom surfaces are joined by not fitting but screw-fastening, so that as compared to the case where in addition to the ones of the top and bottom surfaces, the other surfaces are also joined by fitting, the separation of the front cabinet and the rear cabinet can be easily performed at the time of, for example, maintenance of the flat-panel display unit.

Moreover, in another embodiment of the present invention, the bottom surfaces of the front cabinet and the rear cabinet are joined by the fitting. Further, the top surfaces of the front cabinet and the rear cabinet are joined by the screw-fastening. The above-mentioned predetermined-angles are set in such a manner to allow the bottom surface of the rear cabinet to approach toward the bottom surface of the front cabinet from the top side of the front cabinet when the protruding portions are inserted into the guides while being slid along the guides. According to this invention, the front cabinet and the rear cabinet are easily combined in standing-up states.

The present invention can be also realized by a flat-panel television in which the above-mentioned construction is further embodied. As the embodiment, the flat-panel television of the present invention comprises a housing body that is comprised of a front cabinet and a rear cabinet for housing a flat display panel. At both side faces of the rear cabinet, several base portions that are extended by predetermined length toward the front cabinet from the both side faces are provided. At inner sides of side faces of the front cabinet, engaging portions that are engaged with the base portions are provided. At the base portions, protruding portions that project by predetermined lengths in an outward direction substantially perpendicular to the extended direction toward the front cabinet are formed at predetermined angles relative to a direction perpendicular to a display face of the flat display panel and with predetermined lengths. At the engaging portions, guides for allowing the protruding portions to be slid at the time of mounting the rear cabinet to the front cabinet are respectively formed, at the predetermined angles and with the predetermined lengths, by two parallel protruding portions for guide that project, by predetermined lengths, toward an inward direction perpendicular to the side faces from the inner sides of the side faces. The protruding portions and the guides are comprised of triangular cross-section that allow spaces between the protruding portions and the guides to become narrower as the protruding portions are inserted into the guides. Moreover, at a top surface of the rear cabinet, a fitting base portion that is extended by a predetermined length, toward the front cabinet from the top surface and has a plurality of fitting hole portions is provided. At an inner side of a top surface of the front cabinet, a plurality of fitting claw portions that are fitted in the several fitting hole portions are formed. Moreover, at a bottom surface of the front cabinet, a plurality of threaded holes are formed and, at a bottom surface of the rear cabinet, a plurality of screw-insertion holes corresponding to the threaded holes are formed. The housing is assembled by inserting the protruding portions into the guides while the protruding portions are slid along the guides, making engagements between the fitting hole portions and the fitting claw portions, enabling the front cabinet and the rear cabinet to be combined together and, in the integrally combined state, inserting fixing-screws to be inserted through the screw-insertion holes and inserting the fixing-screws to be threaded into the threaded holes enabling the bottom surfaces to be joined by screw-fastening.

According to this invention, after the front cabinet and the rear cabinet have been combined together, the protruding portions are allowed to be slid only in a direction along the guides, so that shift of a relative position of the front cabinet and the rear cabinet in a direction perpendicular to a display face of the flat display panel is restricted and, therefore, if only the bottom surfaces are screw-fastened, even if screw-fastening is not performed at the side faces and top surfaces, separation of the front cabinet and the rear cabinet is restricted.

Therefore, the protruding portions are inserted into the guides at the side faces of the front cabinet and the rear cabinet while being slid along the guides, in lieu of screw-fastening and fitting is performed at the top surfaces in lieu of screw-fastening, whereby the front cabinet and the rear cabinet are combined together. After the combining, the protruding portions are allowed to be slid only in the direction along the guides, so that the assembling time of the flat-panel television and the number of its parts are held down as less as possible while ensuring the junction strength of the front cabinet and the rear cabinet and higher efficiency of the assembling work (a reduction in cost) can be achieved. Moreover, the shapes of the protruding portions and the guides are made the wedge-shaped structures, so that a jar is further restricted after the front cabinet and the rear cabinet have been combined together. Moreover, the bottom surfaces are joined by not fitting but screw-fastening when the front cabinet and the rear cabinet are combined together, so that as compared to a case where in addition to the top surfaces, the bottom surfaces are also joined by fitting, separation of the front cabinet and the rear cabinet can be easily performed at the time of, for example, maintenance of the flat-panel television.

While the embodiments of the present invention have been fully discussed above with reference to the drawings, the present invention may be applied to other embodiments.

For example, while in the above-mentioned embodiments, the top surfaces of the front cabinet 12a and the rear cabinet 12b are joined by the fitting and the bottom surfaces are joined by the screw-fastening, vice verse, the bottom surfaces of the front cabinet 12a and the rear cabinet 12b may be joined by fitting and the top surfaces may be joined by screw-fastening. In this case, the predetermined angles relative to the direction perpendicular to the display face 11a of the liquid crystal panel 11 are set in such a manner to allow the bottom surface 12b4 of the rear cabinet 12b to approach toward the bottom surface 12a4 of the front cabinet 12a from the top surface 12a3 side when the protruding portions 13a1, 13b1, 13c1, 13d1 are inserted into the guides 14a1, 14b1, 14c1, 14d1 while being slid along the guides 14a1, 14b1, 14c1, 14d1. This makes it easier to cause the front cabinet 12a and the rear cabinet 12b to be combined in standing-up states.

Moreover, while in the above-mentioned embodiments, the protruding portions 13a1, 13b1, 13c1, 13d1 are formed at the base portions 13a, 13b, 13c, 13d and the guides 14a1, 14b1, 14c1, 14d1 are formed at the engaging portions 14a, 14b, 14c, 14d, the guides may be formed at the base portions 13a, 13b, 13c, 13d and the protruding portions may be formed at the engaging portions 14a, 14b, 14c, 14d. By such a construction as to be made in this way, it is possible to also obtain the same effects.

Moreover, the protruding portions 13a1, 13b1, 13c1, 13d1 may be, for example, protrusions of pillar-shapes, etc. By constructing in this way, the protruding portions 13a1, 13b1, 13c1, 13d1 are easily formed.

Incidentally, the above-mentioned embodiments are illustrative to the end and the present invention can be realized by embodiments in which various changes and modifications are made on the basis of understanding by those skilled in the art.

While the invention has been particularly shown and described with respect to preferred embodiments thereof, it should be understood by those skilled in the art that the foregoing and other changes in form and detail may be made therein without departing from the spirit and scope of the invention as defined in the appended claims.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. An assembling structure for a flat-panel display unit, comprising:
   a housing body comprised of a front cabinet and a rear cabinet is assembled to house a flat display panel;
   at both side faces of at least one of the front and rear cabinet, several base portions that are extended by predetermined lengths, toward the other of the front and rear cabinets from the both side faces are provided;
   at inner sides of side faces of the other one of the front and rear cabinet, engaging portions for engaging the base portions are provided;
   at regions of the base portions, protruding portions are provided;
   at regions of the engaging portions, guides for allowing the protruding portions to be slid are formed at predetermined angles relative to a direction perpendicular to a display face of the flat display panel; and
   the housing is assembled by inserting the protruding portions into the guides while the protruding portions are slid along the guides, enabling the front cabinet and the rear cabinet to be combined together.

2. An assembling structure for a flat-panel display unit, according to claim 1, wherein the guides are comprised of triangular cross-section that allow spaces between the protruding portions and the guides to become narrower as the protruding portions are inserted into the guides.

3. An assembling structure for a flat-panel display unit, according to claim 1, wherein the protruding portions are formed at the base portions so as to project, by predetermined lengths, in an inward direction perpendicular to the engaging portions, and the guides are formed, at the predetermined angles and with the predetermined lengths, at the engaging portion, by two parallel protruding portions for guide that project, by predetermined lengths, in an outward direction perpendicular to the base portions are provided at the base portions.

4. An assembling structure for a flat-panel display unit, according to claim 1, wherein at one of top and bottom surfaces that is perpendicular to the side faces of at least one of the front cabinet and the rear cabinet, several fitting portions are formed, and at one of top and bottom surfaces of the other one of the front cabinet and the rear cabinet, fitted-in portions that are fitted in the fitting portions when the front cabinet and the rear cabinet are combined together are formed.

5. An assembling structure for a flat-panel display unit, according to claim 4, wherein the fitting portions are several fitting-hole portions that are rectangular-shaped holes, the fitting portions being formed in fitting base portion that is extendingly provided, by a predetermined length, toward the other of the front cabinet and the rear cabinet from the one surface of the one of the front cabinet and the rear cabinet, and the fitted-in portions are several claws that are rectangular parallelepiped-shaped protrusions with wedge-shaped tips that are fitted in the several fitting-hole portions.

6. An assembling structure for a flat-panel display unit, according to claim 4, wherein the bottom surfaces of the front cabinet and the rear cabinet are joined by fitting, the top surfaces of the front cabinet and the rear cabinet are joined by screw-fastening, and the predetermined-angles are set in such a manner to allow the bottom surface of the rear cabinet to approach toward the bottom surface of the front cabinet from a top face side of the front cabinet when the protruding portions are inserted into the guides while being slid along the guides.

7. A flat-panel television having a housing body that is comprised of a front cabinet and a rear cabinet for housing a flat display panel:
   at both side faces of the rear cabinet, several base portions that are extended by predetermined lengths toward the front cabinet from the both side faces are provided, at inner sides of side faces of the front cabinet, engaging portions for respectively engaging the base portions are provided;
   at the base portions, protruding portions that project by predetermined lengths in an outward direction substantially perpendicular to an extended direction toward the front cabinet are formed at predetermined angles relative to a direction perpendicular to a display face of the flat display panel and with predetermined lengths;
   at the engaging portions, guides that allow the protruding portions to be slid when the rear cabinet is mounted to the front cabinet are formed at the predetermined angles, the guides are formed at the predetermined angles and with the predetermined lengths by two parallel protruding portions for guide that project toward an inward direction perpendicular to the side faces from inner sides of the side faces;
   the protruding portions and the guides are comprised of triangular cross-section that allow spaces between the protruding portions and the guides to become narrower as the protruding portions are inserted into the guides;
   at a top surface of the rear cabinet, a fitting base portion that is extended by a predetermined length toward the front cabinet from the top surface is provided, the fitting base portion is formed with several fitting hole portions;

at an inner side of a top surface of the front cabinet, several fitting claw portions that are engaged with the several fitting hole portions are formed;

at a bottom surface of the front cabinet, several threaded holes are formed;

at a bottom surface of the rear cabinet, several screw-insertion holes are formed; and the housing is assembled by inserting the protruding portions into the guides while the protruding portions are slid along the guides, making engagements between the fitting hole portions and the fitting claw portions, enabling the front cabinet and the rear cabinet to be combined together and, in the integrally combined state, inserting fixing-screws to be inserted through the screw-insertion holes and inserting the fixing-screws to be threaded into the threaded holes enabling the bottom surfaces to be joined by screw-fastening.

8. An assembling structure for a flat-panel display unit, according to claim 1, wherein the predetermined-angles are set in such a manner to allow the bottom surface of the rear cabinet to approach toward the bottom surface of the front cabinet.

9. An assembling structure for a flat-panel display unit, according to claim 1, wherein plurality of threaded holes are formed at the bottom surface of at least one of the front and rear cabinet, plurality of screw-insertion holes corresponding to the threaded holes are formed at the bottom surface of the other one of the front and rear cabinet, the predetermined angles of the guides are different angles from the direction of the plurality of screw-insertion holes.

* * * * *